(No Model.)
J. E. HARKINS & J. B. WILLIS.
BREAD TOASTER OR MEAT BROILER.
No. 375,288. Patented Dec. 20, 1887.
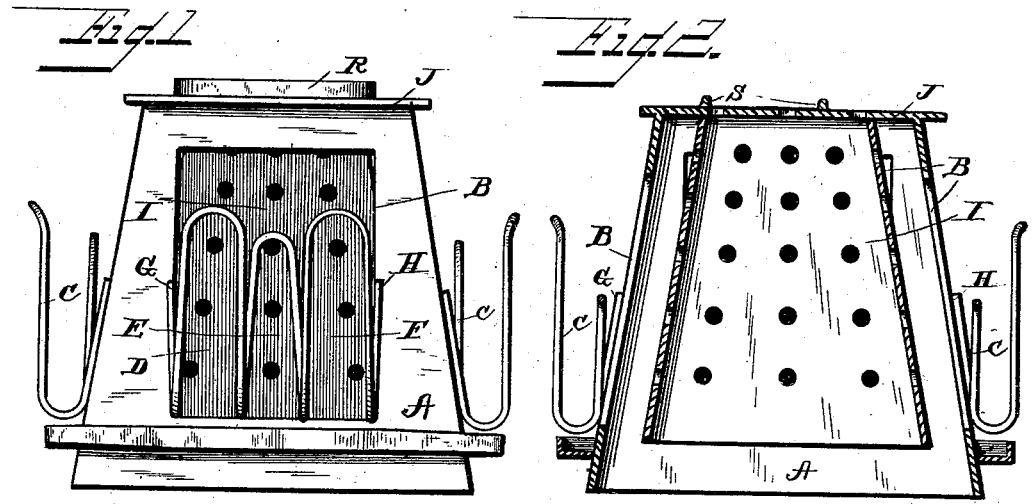
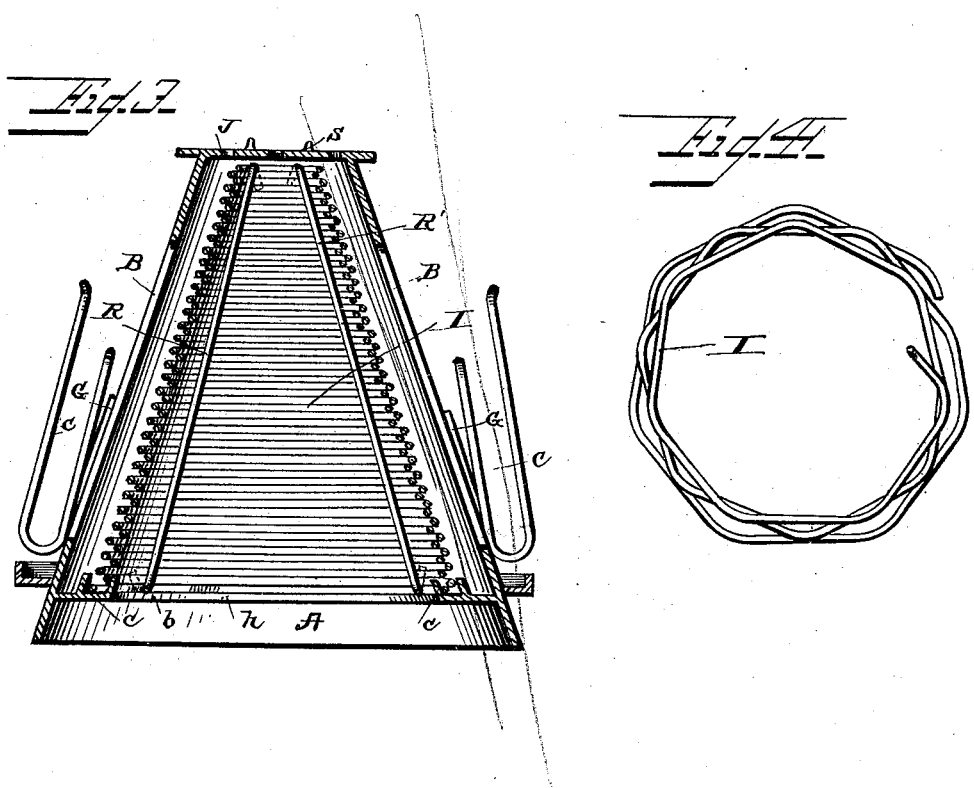
WITNESSES
F. L. Ourand
Phile Masi
INVENTORS
James E. Harkins,
James B. Willis.
by Anderson & Smith
Attorneys

UNITED STATES PATENT OFFICE.

JAMES E. HARKINS AND JAMES B. WILLIS, OF ANN ARBOR, MICHIGAN.

BREAD-TOASTER OR MEAT-BROILER.

SPECIFICATION forming part of Letters Patent No. 375,288, dated December 20, 1887.

Application filed February 26, 1887. Serial No. 229,017. (No model.)

*To all whom it may concern:*

Be it known that we, JAMES E. HARKINS and JAMES B. WILLIS, citizens of the United States, residents of Ann Arbor, in the county of Washtenaw and State of Michigan, have invented certain new and useful Improvements in Bread-Toasters or Meat-Broilers; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of one form of the toaster in a side view. Fig. 2 is a longitudinal sectional view of the same. Fig. 3 is a longitudinal sectional view of another form of toaster. Fig. 4 is a plan view of a portion of the wire bell, showing its construction.

Our invention relates to toasters or broilers; and it consists in the construction and novel combination of parts, as hereinafter described and claimed.

Referring by letter to the accompanying drawings, A designates the outer shell of the toaster, which is preferably in the shape of the frustum of a pyramid, and is provided in each of its four walls or sides with an opening or window, B. At each opening or window B, and secured outside of the same, are holders C, which are made of wire bent to form three (more or less) clamping-fingers, D E F. The ends of arms G H of the wires are soldered or otherwise secured to the shell so as to extend across the windows and to project nearly to the tops of the same. The holders extend laterally from the body of the shell A to permit the slice of bread that is to be toasted to be conveniently inserted to place and removed.

The inner shell, I, of the toaster is of cast or sheet metal, preferably in the form of the frustum of a pyramid, and is secured at its upper end to the top plate, J, of the outer shell, so that said inner shell is suspended within the outer shell. We prefer, however, to make the inner shell, I, of wire, which is first tightly wound around the frustum of a pyramid having six sides, and then permitted to unwind, to give it a nearly round yet polygonal shape—that is, having many corners. This form of inner shell permits us to increase the number of windows and the shape of the outer shell to correspond, if desired.

The shape of both the outer and inner shells may be three-sided, if desired, the shape in outline not being the essential feature of the invention.

Below the clamping-fingers the outer shell is surrounded by a trough to receive the gravy when broiling meat.

Upon the top of the outer shell is provided a raised ring, R, or studs, S, (three or more in number,) on which to rest a vessel to heat its contents.

The walls of the inner shell, I, when made of sheet metal or cast metal, are perforated. The wire shell is, however, preferred, as it is less expensive to construct it of such material, and we have been taught by experience that the best results are attained by the use of wire.

The inner shell, when made of wire, after it has been allowed to expand, as above described, is held in said expanded shape by four (more or less) hook-rods, R', of wire, which are preferably passed up through the interior of said inner shell and hooked outwardly over the upper and lower edges of said wire shell. In this construction we provide the toaster with a bottom, $b$, having a hole, $h$, in the center equal in diameter to the diameter of the bottom of the shell or inner bell. We provide this bottom, $b$, with an upturned flange, $c$, which is designed to and does engage the lower edge of the wire bell, in order to hold said bell or shell firmly and render the device more substantial in its construction.

It is obvious that the device above described may be mounted on the top plate of a stove over an open pot-hole, and the required heat obtained from a bed of incandescent coals in the fire-chamber of the stove; or, if convenient, a gas-flame may be directed into the inner shell. We do not, however, confine ourselves to the use of any specific means for heating the toasting or broiling device.

Having described our invention, what we claim, and desire to secure by Letters Patent, is—

1. The combination, with the outer shell having the open windows, of the suspended inner open-work shell and spring-holders, and encircling trough, substantially as specified.

2. The combination, with the outer shell having the open windows and the top provided with a raised support on its upper face, of the suspended inner open-work shell, the spring-holders, and the trough surrounding the outer shell, substantially as specified.

3. The combination, with an outer shell provided with windows and external holders, for the purpose described, of the inner shell formed of wire coiled, as described, and the hooked rods engaging the upper and lower coils of said inner shell, as specified.

In testimony whereof we affix our signatures in presence of two witnesses.

JAMES E. HARKINS.
JAMES B. WILLIS.

Witnesses:
J. F. LAWRENCE,
J. W. BENNETT.